United States Patent
Park et al.

(10) Patent No.: US 7,957,475 B2
(45) Date of Patent: Jun. 7, 2011

(54) DUAL CARRIER MODULATION (DCM) DEMAPPER AND DCM DEMAPPING METHOD

(75) Inventors: Sung Chung Park, Yongin-si (KR); Yun Young Kim, Yongin-si (KR); Jun Jin Kong, Yongin-si (KR); Jae Ho Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1082 days.

(21) Appl. No.: 11/704,907

(22) Filed: Feb. 12, 2007

(65) Prior Publication Data

US 2008/0056392 A1 Mar. 6, 2008

(30) Foreign Application Priority Data

Aug. 31, 2006 (KR) .................. 10-2006-0083709

(51) Int. Cl.
*H04K 1/10* (2006.01)
(52) U.S. Cl. ........ 375/260; 375/262; 375/340; 375/341
(58) Field of Classification Search .................. 375/260, 375/341, 340, 262; 370/69.1; 455/59; 714/786, 714/794, 795
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,078,626 | A * | 6/2000 | Ramesh | 375/262 |
| 6,625,239 | B1 * | 9/2003 | Shiraishi et al. | 375/354 |
| 2004/0091058 | A1 * | 5/2004 | Tosato et al. | 375/261 |
| 2005/0195765 | A1 * | 9/2005 | Sharon et al. | 370/330 |
| 2005/0220203 | A1 | 10/2005 | Ojard | |
| 2006/0029162 | A1 * | 2/2006 | Chi | 375/340 |
| 2007/0058756 | A1 * | 3/2007 | Mahadevappa et al. | 375/340 |

OTHER PUBLICATIONS

Wang et al. "A technique for demapping dual carrier modulated UWB OFDM signals with improved performance", IEEE VTC, 2005, pp. 38-42.
Tosato et al. "Simplified soft-output demapper for binary interleaved COFDM with application to HIPERLAN/2", IEEE ICC, 2002, pp. 664-668.
Wang et al., "A technique for demapping dual carrier modulated UWB OFDM signals with improved performance", IEEE VTC, 2005, pp. 38-42.
Tosato et al., "Simplified soft-output demapper for binary interleaved COFDM with application to HIPERLAN/2", IEEE ICC, 2002, pp. 664-668.

* cited by examiner

*Primary Examiner* — Shuwang Liu
*Assistant Examiner* — Helene Tayong
(74) *Attorney, Agent, or Firm* — Sughrue Mion, PLLC

(57) ABSTRACT

A DCM demapper and a DCM demapping method are provided. The DCM demapper includes: a basic signal generation unit generating a plurality of basic signals using a signal and channel information of two subcarriers; a soft decision generation unit generating a plurality of soft decisions using the plurality of basic signals; and a soft decision selection unit selecting a soft decision corresponding to each bit of the two subcarriers among the generated soft decisions.

11 Claims, 8 Drawing Sheets

DUAL CARRIER MODULATION (DCM) DEMAPPER AND DCM DEMAPPING METHOD

CROSS-REFERENCE TO RELATED APPLICATION

This application claims priority from Korean Patent Application No. 10-2006-0083709, filed on Aug. 31, 2006, in the Korean Intellectual Property Office, the entire disclosure of which is incorporated herein by reference.

BACKGROUND OF THE INVENTION

1. Field of the Invention

Methods and apparatuses consistent with the present invention relate to a Dual Carrier Modulation (DCM). More particularly, the present invention relates to the DCM and a DCM demapping method for soft decision demodulation.

2. Description of Related Art

DCM is for increasing a frequency diversity gain in a receiver to improve error effectiveness for a high speed data rate by broadening a frequency domain.

A DCM modulation method improves reception performance by gaining frequency diversity by transmitting 4 bits in two subcarriers. As an example, the frequency diversity may be gained by simultaneously transmitting the 4 bits b0, b1, b50 and b51 in subcarrier 0 and subcarrier 50.

Figure 1:
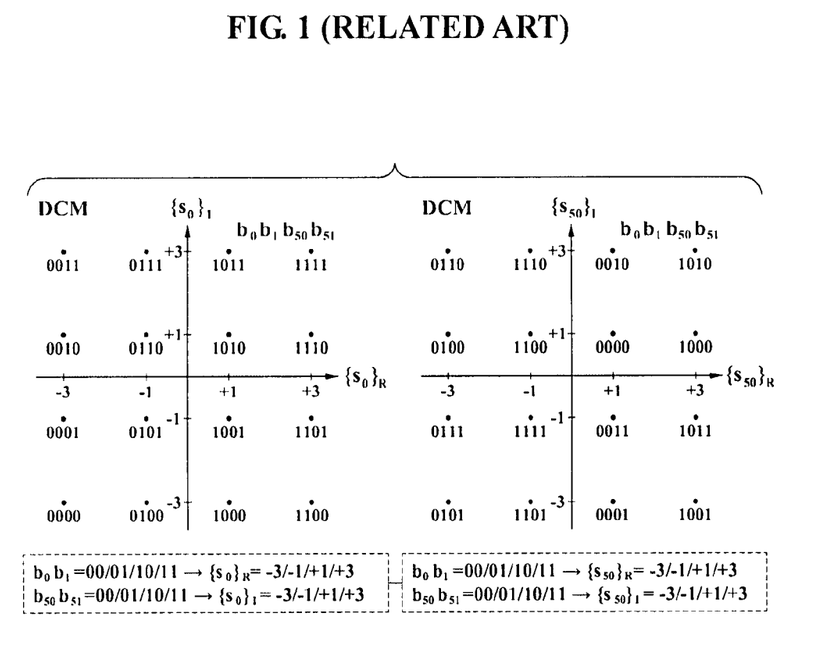
FIG. 1 is a constellation diagram illustrating an example of bit-symbol mapping of a subcarrier with respect to a DCM demodulation method according to a related art.

FIG. 1 illustrates an example of bit-symbol mapping of a subcarrier with respect to the DCM demodulation method. Specifically, FIG. 1 relates to DCM demodulation with respect to the subcarrier 0 and subcarrier 50, which simultaneously transmits the 4 bits b0, b1, b50 and b51. For convenience, the DCM demodulation and DCM modulation of the subcarrier 0 and subcarrier 50 will be described in the specification, and the bit-symbol mapping of remaining subcarriers is performed in the same way.

Referring to FIG. 1, b0 and b1 among the 4 bits are transmitted to an in-phase component of the two subcarriers, and the b50 and b51 are transmitted to a quadrature-phase component of the two subcarriers. Subsequently, b0 and b1 are recovered as the in-phase component of a received signal in the receiver, and the b50 and b51 are recovered as the quadrature-phase component of the received signal.

Figure 2:
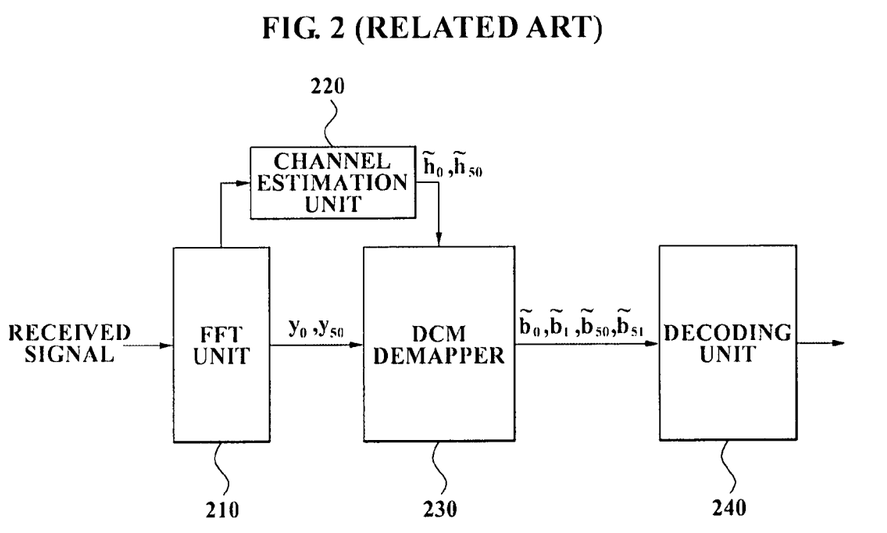
FIG. 2 is a diagram illustrating an example of a DCM demodulator in a receiver according to a related art.

FIG. 2 illustrates an example of a DCM demodulator in a receiver.

Referring to FIG. 2, the DCM demodulator includes a Fast Fourier Transform (FFT) unit 210, a channel estimation unit 220, a DCM demapper 230, and a decoding unit 240.

The FFT unit 210 outputs signals $y_0$ and $y_{50}$ from a received signal of the two subcarriers, i.e., subcarrier 0 and subcarrier 50, which acquire an FFT calculation result of the received signal.

The channel estimation unit 220 outputs channel information $\tilde{h}_0$, $\tilde{h}_{50}$, of the two subcarriers.

The DCM demapper 230 performs DCM demodulation using the signals $y_0$ and $y_{50}$ and the channel information of the two subcarriers in order to output soft decisions $\tilde{h}_0$, $\tilde{h}_1$, $\tilde{h}_{50}$, $\tilde{h}_{51}$ of the 4 bits in correspondence to the DCM demodulation.

The decoding unit 240 decodes the soft decisions of the 4 bits.

The conventional DCM demapper performs DCM demodulation in the following four ways:

i) Using Zero-Forcing Equalization (ZFE) and Linear Combination (LC) for a ZFE-LC method. The ZEF-LC method is simple to embody, however the reception performance is not good due to a noise amplification effect caused by the ZFE. In this case, the noise amplification effect indicates a phenomenon that a noise comparatively increases while a subcarrier, whose channel gain is less, undergoes equalization.

ii) Using a minimum mean square error equalizer (MMSEE) for a MMSEE-LC method, instead of the ZFE, in order to solve the defect of the ZFE-LC. The MMSEE-LC method may supplement the noise amplification effect by minimizing an error of received signal estimation, however there is a defect in estimating an average power of the noise. Namely, the two methods have problems in that reception performance becomes degraded due to the noise amplification since a basic theory, i.e., soft decisions being generated while all data are transmitted by the two subcarriers, of DCM is ignored.

iii) There is a channel state information (CSI) log-likelihood ratio (LLR) method, which calculates a theoretical log likelihood ratio using an exponential/a log function. The CSI method may generates the most accurate soft decision, however there are problems in that this embodiment is difficult to realize since the exponential/log function are required to be calculated, and there may be a serious error due to quantizing. In this case, the CSI indicates channel state information.

iv) There is a CSI (BAL) method, which can remarkably reduce the noise amplification effect without calculating the theoretical LLR. The method is simple to embody since it may be configured by adding a result of a multiplication of a weighting factor and the ZFE-LC for a balance between channel gains, however there is a problem in that the reception performance comparatively degrades more than the CSI (LLR) method since a soft decision far from the theoretical LLR is generated.

Accordingly, a new DCM demapper, which can generate a soft decision close to the theoretical LLR is required.

SUMMARY OF THE INVENTION

An embodiment of the present invention provides a DCM demapper and a DCM demapping method which can be simple to embody and generate an accurate soft decision.

The present invention also provides a DCM demapper and a DCM demapping method which can reduce a noise amplification effect by generating a soft decision close to a theoretical LLR, and improve reception performance.

The present invention also provides a DCM demapper and a DCM demapping method which can extend a communication distance for DCM demodulation and modulation by improving reception performance.

The present invention also provides a DCM demapper and a DCM demapping method which can reduce complexity of a configuration of hardware by approximating an exponential/a log function calculation of a theoretical LLR.

The present invention also provides a DCM demapper and a DCM demapping method which can improve speed of generating a soft decision by reducing the complexity of a configuration of hardware.

The present invention also provides a DCM demapper and a DCM demapping method which reduce manufacturing costs by reducing complexity of a configuration of hardware.

According to an aspect of the present invention, there is provided a DCM demapper including: a basic signal generation unit generating a plurality of basic signals using a signal and channel information of two subcarriers; a soft decision generation unit generating a plurality of soft decisions using the plurality of basic signals; and a soft decision selection unit selecting a soft decision corresponding to each bit of the two subcarriers among the generated soft decisions.

In this case, the basic signal generation unit generates a signal with respect to a power difference the between two channels and two signals with respect to a multiple of a conjugate of a channel gain by the signal for each of the two subcarriers, using the signal and the channel information of the two subcarriers.

In this case, the soft decision generation unit includes a first soft decision generation unit generating the plurality of soft decisions using the signal with respect to a power difference between the two channels and an in-phase component of the remaining two signals; and a second soft decision generation unit generating the plurality of soft decisions using the signal with respect to the power difference between the two channels and a quadrature-phase component of the remaining two signals.

In this case, the soft decision selection unit includes a first soft decision selection unit selecting the soft decision corresponding to two bits of the subcarriers among the plurality of soft decisions, which are generated from the first soft decision generation unit; and a second soft decision selection unit selecting the soft decision corresponding to remaining two bits of the subcarriers among the plurality of soft decisions, which are generated from the second soft decision generation unit.

In this case, the first soft decision selection unit selects the soft decision, corresponding to the two bits of the subcarriers, using a sign of four predetermined soft decisions as a selection signal, among seven soft decisions, which are generated from the first soft decision generation unit, and the second soft decision selection unit selects the soft decision, corresponding to the remaining two bits of the subcarriers, according to a sign of four predetermined soft decisions as a selection signal, among seven soft decisions generated from the second soft decision generation unit. In this case, the first and second soft decision selection units may be multiplexers.

According to another aspect of the present invention, there is provided a DCM demapping method including: generating a plurality of basic signals using a signal and channel information of two subcarriers; generating a plurality of soft decisions using the plurality of basic signals; and selecting a soft decision corresponding to each bit of the two subcarriers, among the generated soft decisions.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 3:
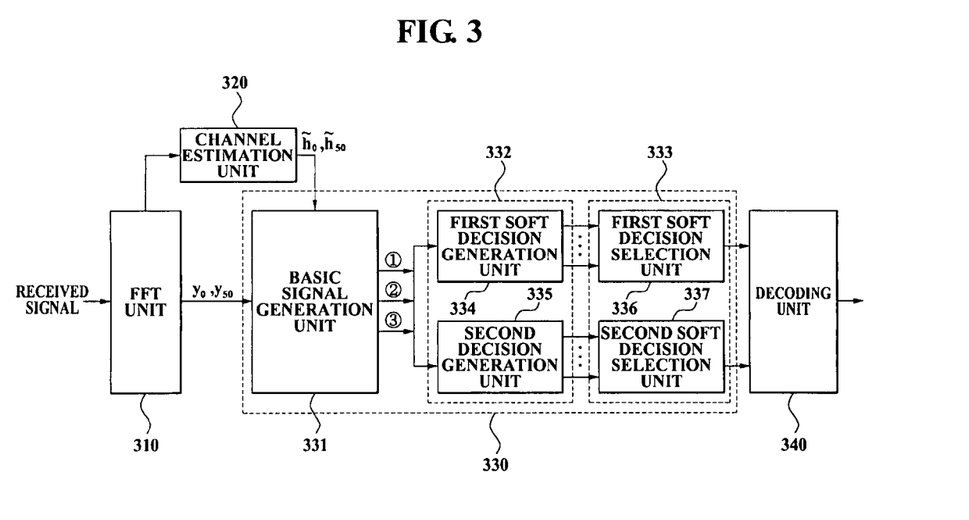
FIG. 3 is a block diagram illustrating a configuration of a DCM demodulator having a DCM demapper according to an exemplary embodiment of the present invention.

FIG. 3 is a block diagram illustrating a configuration of a DCM demodulator having a DCM demapper according to an exemplary embodiment of the present invention.

Referring to FIG. 3, the DCM demodulator includes an FFT unit 310, a channel estimation unit 320, a DCM demapper 330 and a decoding unit 340.

The FFT unit 310 outputs signals $y_0$ and $y_{50}$ from a received signal of the two subcarriers, i.e. subcarrier 0 and subcarrier 50, which acquire an FFT calculation result of the received signal.

The channel estimation unit 320 outputs channel information $\tilde{h}_0$, $\tilde{h}_{50}$, of the two subcarriers.

The DCM demapper 330 includes a basic signal generation unit 331, a first soft decision generation unit 332 and a second soft decision selection unit 333.

The basic signal generation unit 331 generates three basic signals ①, ②, and ③ below from the signals $y_0$ and $y_{50}$ of the two subcarriers and the channel information $\tilde{h}_0$, $\tilde{h}_{50}$. In this instance, the generated basic signals from ① to ③ are represented by Equation 1, ① $2(|\tilde{h}_0|^2 - |\tilde{h}_{50}|^2)$ ② $|\tilde{h}_0|^2 \cdot \tilde{s}_0 = \tilde{h}^*_0 y_0$ ③ $|\tilde{h}_{50}|^2 \cdot \tilde{s}_{50} = \tilde{h}^*_{50} y_{50}$ [Equation 1]

As shown in Equation 1, the three basic signals generated from the basic signal generation unit 331 include a signal ① representing a power difference between the two channels, a signal ② representing a product of a conjugate of a channel gain $\tilde{h}_0$ of the subcarrier 0 and the signal $y_0$, and a signal ③ representing a product of a conjugate of a channel gain $\tilde{h}_{50}$ of the remaining subcarrier 50 and the signal $y_{50}$.

In this case, the basic signal ① may be calculated in a preamble section beforehand since the basic signal ① is irrelevant to the signals $y_0$ and $y_{50}$. Accordingly, the basic signal ① is irrelevant to an operation speed of a hardware of an exemplary embodiment.

Figure 4:
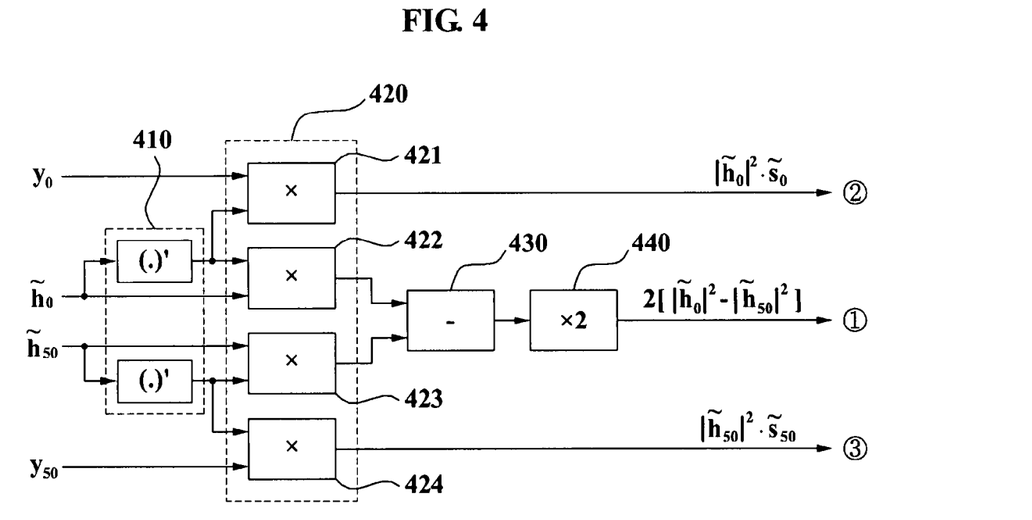
FIG. 4 is a diagram illustrating a configuration of the basic signal generation unit of FIG. 3.

FIG. 4 is a diagram illustrating a configuration of the basic signal generation unit 331 of FIG. 3.

Referring to FIG. 4, the basic signal generation unit 331 of FIG. 3 includes a conjugate unit 410, a multiplication unit 420 consisting of four multipliers 421, 422, 423, and 424, a subtracter 430, and a shifter 440.

A power signal for each channel is outputted by multiplying each channel signal $\tilde{h}_0^*$ and $\tilde{h}_{50}^*$, conjugated by the conjugate unit 410, by each channel signal $\tilde{h}_0$, $\tilde{h}_{50}$, by each of the multipliers 422 and 423, the basic signal ① is generated since the power signal for the each channel passes through the subtracter 430 and the shifter 440.

Also, the basic signal ② is generated since the signal $y_0$ of a channel subcarrier 0 and a conjugated channel signal of a channel signal 0 are received at the multiplier 421.

Also, the basic signal ③ is generated since the signal $y_{50}$ of a channel subcarrier 50 and a conjugated channel signal of a channel signal 50 are received at the multiplier 424.

In this case, when the basic signal generation unit 331 of FIG. 3 is applied to WiMedia ultra wideband (UWB), complexity of hardware may be reduced since the two multipliers 421 and 424 may be repeatedly used, which corresponds to a part of maximum ratio combining (MRC) used in a low speed communication mode of less than 200 Mbps.

Referring back to FIG. 3, the soft decision generation unit 332 includes a first soft decision generation unit 334 and a second decision generation unit 335, the first and second soft decision generation units 334 and 335 respectively generating a plurality of soft decisions according to the basic signals ① through ③ generated by the basic signal generation unit 331.

In this case, the first soft decision generation unit 334 generates seven soft decisions using an in-phase component of the basic signals ①, ②, and ③, and the second soft decision unit 335 generates seven soft decisions using a quadrature-phase component of the basic signals ①, ②, and ③.

In this case, the seven soft decisions generated from the first and second soft decision generation units 334 and 335 using the basic signals ①, ②, and ③ indicate a difference of a squared distance, and each of the seven soft decisions respectively generated from the first and second soft decision generation units 334 and 335 are represented by Equations 2 and 3.

$$d_{(0,0)}^2 - d_{(0,1)}^2 = \{|\tilde{h}_0|^2 \cdot \tilde{s}_0\}_R - 2\{|\tilde{h}_{50}|^2 \cdot \tilde{s}_{50}\}_R + 2(|\tilde{h}_0|^2 - |\tilde{h}_{50}|^2)$$ [Equation 2]

$$d_{(1,0)}^2 - d_{(1,1)}^2 = \{|\tilde{h}_0|^2 \cdot \tilde{s}_0\}_R - 2\{|\tilde{h}_{50}|^2 \cdot \tilde{s}_{50}\}_R - 2(|\tilde{h}_0|^2 - |\tilde{h}_{50}|^2)$$

$$d_{(0,0)}^2 - d_{(1,0)}^2 = 2\{|\tilde{h}_0|^2 \cdot \tilde{s}_0\}_R + \{|\tilde{h}_{50}|^2 \cdot \tilde{s}_{50}\}_R + 2(|\tilde{h}_0|^2 - |\tilde{h}_{50}|^2)$$

$$d_{(0,1)}^2 - d_{(1,0)}^2 = \{|\tilde{h}_0|^2 \cdot \tilde{s}_0\}_R + 3\{|\tilde{h}_{50}|^2 \cdot \tilde{s}_{50}\}_R$$

$$d_{(0,1)}^2 - d_{(1,1)}^2 = 2\{|\tilde{h}_0|^2 \cdot \tilde{s}_0\}_R + \{|\tilde{h}_{50}|^2 \cdot \tilde{s}_{50}\}_R - 2(|\tilde{h}_0|^2 - |\tilde{h}_{50}|^2)$$

$$d_{(0,0)}^2 - d_{(1,1)}^2 = 3\{|\tilde{h}_0|^2 \cdot \tilde{s}_0\}_R - \{|\tilde{h}_{50}|^2 \cdot \tilde{s}_{50}\}_R$$

$$d_{(1,0)}^2 - d_{(0,1)}^2 = d_{(0,1)}^2 - d_{(1,0)}^2$$

As shown in Equation 2, the soft decisions generated from the first soft decision unit 334 is generated using the in-phase component of the basic signals. Namely, the difference of the squared distance "d" with respect to b0 and b1 is calculated from the in-phase component.

$$d_{(0,0)}^{\prime 2} - d_{(0,1)}^{\prime 2} = \{|\tilde{h}_0|^2 \cdot \tilde{s}_0\}_I - 2\{|\tilde{h}_{50}|^2 \cdot \tilde{s}_{50}\}_I + 2(|\tilde{h}_0|^2 - |\tilde{h}_{50}|^2)$$ [Equation 3]

$$d_{(1,0)}^{\prime 2} - d_{(1,1)}^{\prime 2} = \{|\tilde{h}_0|^2 \cdot \tilde{s}_0\}_I - 2\{|\tilde{h}_{50}|^2 \cdot \tilde{s}_{50}\}_I - 2(|\tilde{h}_0|^2 - |\tilde{h}_{50}|^2)$$

$$d_{(0,0)}^{\prime 2} - d_{(1,0)}^{\prime 2} = 2\{|\tilde{h}_0|^2 \cdot \tilde{s}_0\}_I + \{|\tilde{h}_{50}|^2 \cdot \tilde{s}_{50}\}_I + 2(|\tilde{h}_0|^2 - |\tilde{h}_{50}|^2)$$

$$d_{(0,1)}^{\prime 2} - d_{(1,0)}^{\prime 2} = \{|\tilde{h}_0|^2 \cdot \tilde{s}_0\}_I + 3\{|\tilde{h}_{50}|^2 \cdot \tilde{s}_{50}\}_I$$

$$d_{(0,1)}^{\prime 2} - d_{(1,1)}^{\prime 2} = 2\{|\tilde{h}_0|^2 \cdot \tilde{s}_0\}_I + \{|\tilde{h}_{50}|^2 \cdot \tilde{s}_{50}\}_I - 2(|\tilde{h}_0|^2 - |\tilde{h}_{50}|^2)$$

$$d_{(0,0)}^{\prime 2} - d_{(1,1)}^{\prime 2} = 3\{|\tilde{h}_0|^2 \cdot \tilde{s}_0\}_I - \{|\tilde{h}_{50}|^2 \cdot \tilde{s}_{50}\}_I$$

$$d_{(1,0)}^{\prime 2} - d_{(0,1)}^{\prime 2} = d_{(0,1)}^{\prime 2} - d_{(1,0)}^{\prime 2}$$

As shown in Equation 3, the soft decisions generated from the second soft decision unit 335 are generated using the quadrature-phase component of the basic signals. Namely, the difference of the squared distance "d" with respect to b50 and b51 is calculated from the quadrature-phase component.

Also, as shown in Equations 2 and 3, each of the seven soft decisions respectively generated from the first and second soft decision generation units 334 and 335 is configured by addition, subtraction, and a multiple of the in-phase component or the quadrature-phase component of the basic signals ①, ②, and ③, and configurations of the two soft decision generation units 334 and 335 are identical to each other. Specifically, a configuration of hardware with respect to the first and the second soft decision generation units 334 and 335 may be identically configured.

Figure 5:
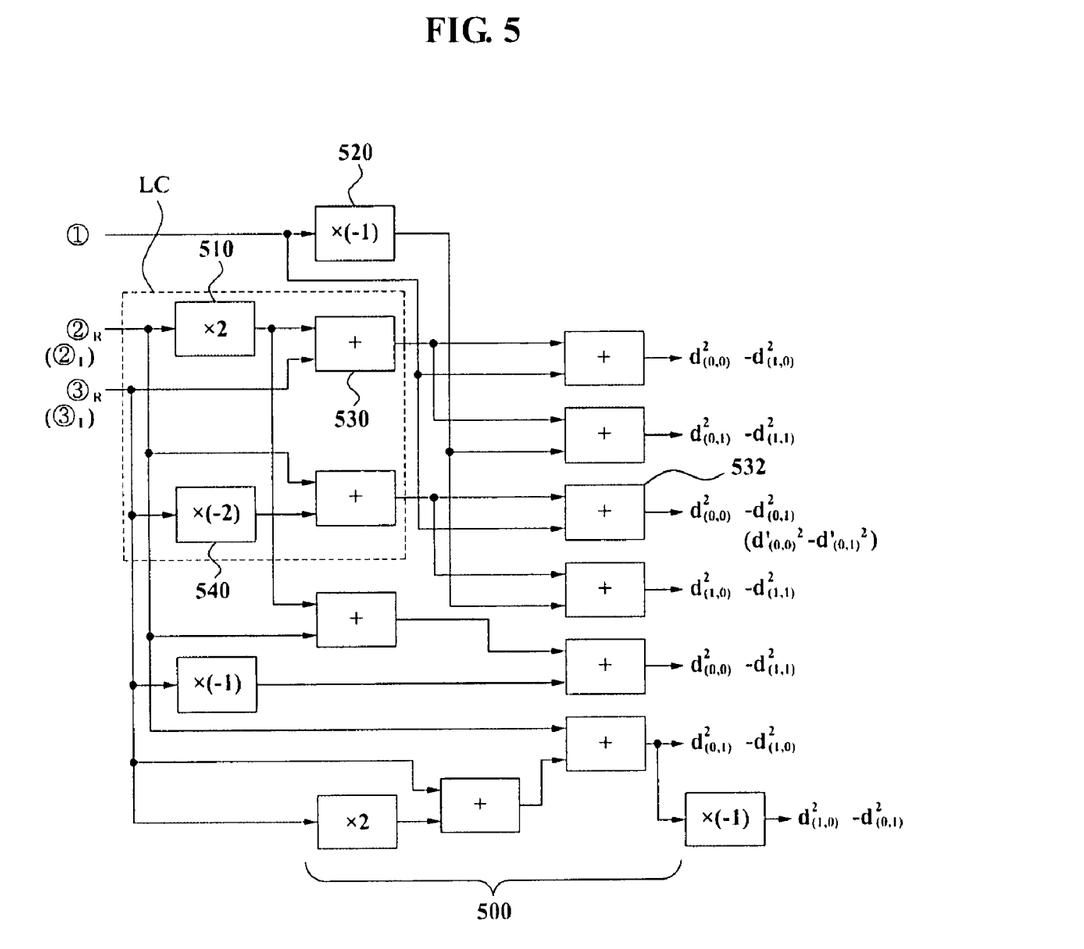
FIG. 5 is a diagram illustrating a configuration of the first soft decision generation unit of FIG. 3.

FIG. 5 is a diagram illustrating the configuration of the first soft decision generation unit 334 of FIG. 3.

Referring to FIG. 5, the first soft decision unit 334 of FIG. 3 includes a plurality of adders 500, a sign converter 520, and a shifter 510. Namely, the first soft decision generation unit 334 of FIG. 3 generates the seven soft decisions, shown in Equation 2, using the plurality of adders 530, the sign converter 520, and the shifter 510. As an example, a real number component ③$_R$ of the basic signal ③ converted by a block 540 which is a combination of a sign converter and a shifter is added to a real number component ②$_R$ of the basic signal ②, the added value is added to the basic signal ① by the adder 532, subsequently $d_{(0,0)}^2 - d_{(0,1)}^2$ is generated. In this case, also, a soft decision $d_{(0,0)}^{\prime 2} - d_{(0,1)}^{\prime 2}$ is generated from the second soft decision generation unit 335 of FIG. 3 via an operation identical to the $d_{(0,0)}^2 - d_{(0,1)}^2$. The second soft decision generation unit 335 may have a structure that is identical to the first decision generation unit 334 as shown in FIG. 5. Specifically, an imaginary number component of the basic signal ③ converted by a block corresponding to the block 540, which is a combination of a sign converter and a shifter, is added to an imaginary number component of the basic signal ② by an adder, the added result is added to the basic signal ① by an adder corresponding to the adder 532, and subsequently, $d_{(0,0)}^{\prime 2} - d_{(0,1)}^{\prime 2}$ is generated.

Consequently, the first and second soft decision generation units 334 and 335 according to the present invention may be simple to embody by the addition and the shift calculation, and complexity of hardware may be reduced since a linear combination (LC) part shown in FIG. 5 is calculated using an LC used in the conventional ZFE-LC, MMSEE-LC, CSI (BAL).

Referring back to FIG. 3, the soft decision selection unit 333 selects a soft decision corresponding to each bit of the subcarriers among the seven soft decisions respectively generated from the first and second soft decision generation units 334 and 335. In this case, the soft decision selection unit 333 includes the first soft decision selection unit 336 and the second soft decision selection unit 337, the first soft decision generation unit 334 generating the soft decision corresponding to the two bits $\tilde{b}_0$, $\tilde{b}_1$, among the seven soft decisions generated from the first soft decision generation unit 334, and the second soft decision generation unit 335 generating the soft decision corresponding to the two bits $\tilde{b}_{50}$, $\tilde{b}_{51}$, among the seven soft decisions generated from the second soft decision generation unit 335.

In this case, the first soft decision selection unit 336 selects the soft decision corresponding to the two bits $\tilde{b}_0$ and $\tilde{b}_1$ of the subcarriers using a sign of four predetermined soft decisions as a selection signal, among the seven soft decisions which are generated from the first soft decision generation unit 334. In this case, the four predetermined soft decisions as the selection signal in the first soft decision selection unit 336 may be $d_{(0,0)}^2-d_{(1,0)}^2$, $d_{(0,1)}^2-d_{(1,1)}^2$, $d_{(0,0)}^2-d_{(0,1)}^2$ and $d_{(1,0)}^2-d_{(1,1)}^2$ shown in Equation 2.

In this case, the second soft decision selection unit 337 selects the soft decision corresponding to the two bits $\tilde{b}_{50}$ and $\tilde{b}_{51}$ of the subcarriers using a sign of four predetermined soft decisions as a selection signal, among the seven soft decisions which are generated from the second soft decision generation unit 335. In this case, the four predetermined soft decisions as the selection signal in the first soft decision selection unit 337 may be $d'_{(0,0)}{}^2-d'_{(1,0)}{}^2$, $d'_{(0,1)}{}^2-d'_{(1,1)}{}^2$, $d'_{(0,0)}{}^2-d'_{(0,1)}{}^2$ and $d'_{(1,0)}{}^2-d'_{(1,1)}{}^2$ shown in Equation 3.

Specifically, the first and second soft decision selection units 336 and 337 select the soft decision corresponding to each bit, among the seven soft decisions, using the four predetermined soft decision signs as the selection signal. In this case, the selected soft decision corresponds to each bit of the subcarriers and is outputted to the decoding unit 340. In this case, the first soft decision selection unit 336 may select two soft decisions which are identical to or different from each other, using the four predetermined soft decision signs. Also, the second soft decision selection unit 337 may select two soft decisions which are identical to or different from each other, using the tour predetermined soft decision signs.

The first and second soft decision selection units 336 and 337 may be respectively configured as a multiplexer outputting the soft decision corresponding to each bit by the four predetermined soft decision signs. In this case, the first and second soft decision selection units 336 and 337 may be respectively configured as two 4:1 multiplexers.

Figure 6A:
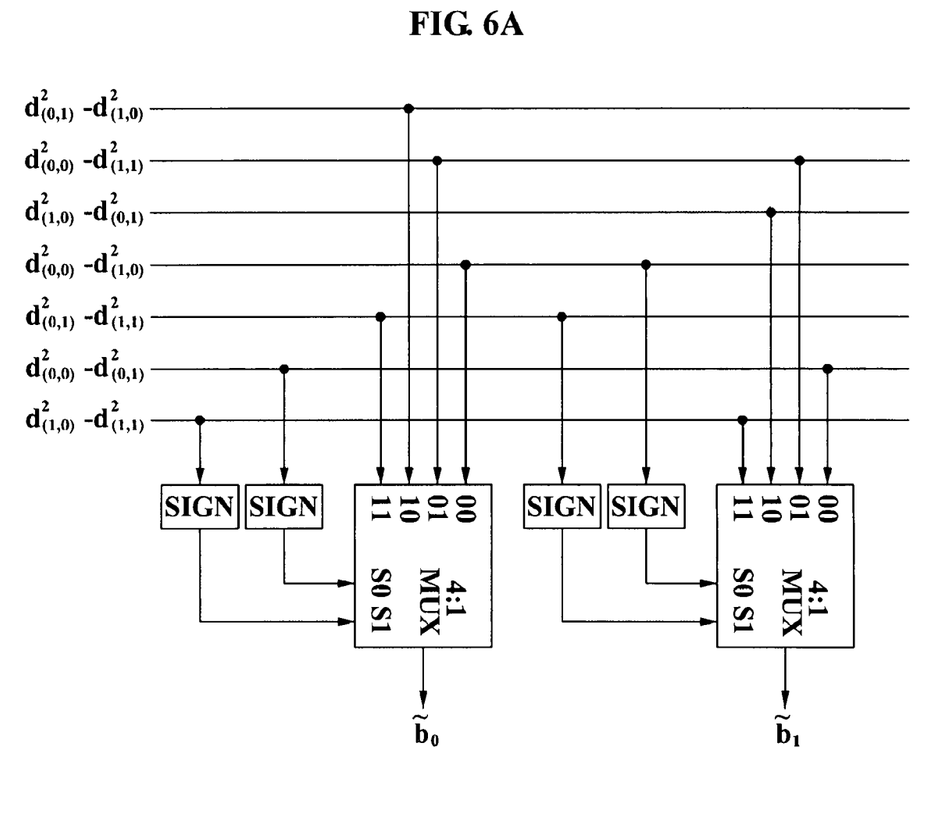
FIGS. 6A and 6B are diagrams illustrating a configuration of the first and the second soft decision selection units of FIG. 3.
Figure 6B:
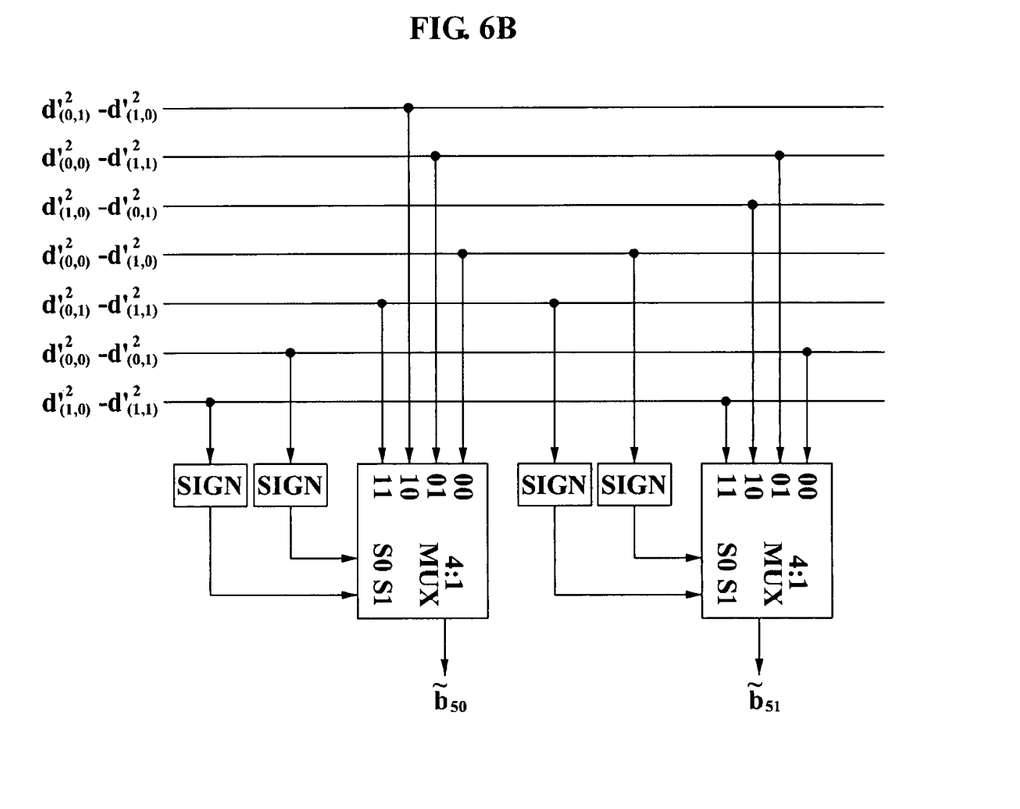

FIGS. 6A and 6B are diagrams illustrating a configuration of the first and the second soft decision selection units of FIG. 3, which are configured as 4:1 multiplexers.

Referring to FIGS. 6A and 6B, the first soft decision selection unit 336 of FIG. 3 and the second soft decision selection unit 337 respectively outputs the soft decision corresponding to each bit of the subcarriers according to the tour predetermined soft decision signs.

Specifically, the first soft decision selection unit 336 of FIG. 3 selects the soft decision corresponding to the two bits $\tilde{b}_0$ and $\tilde{b}_1$ of the subcarriers, among the seven soft decisions, according to the four soft decision signs, using the four soft decisions $d_{(0,0)}^2-d_{(1,0)}^2$, $d_{(0,1)}^2-d_{(1,1)}^2$, $d_{(0,0)}^2-d_{(0,1)}^2$ and $d_{(1,0)}^2-d_{(1,1)}^2$ as a selection signal of the two 4:1 multiplexers.

Also, the second soft decision selection unit 337 of FIG. 3 selects the soft decision corresponding to the two bits $\tilde{b}_{50}$ and $\tilde{b}_{51}$ of the subcarriers, among the seven soft decisions, according to the four soft decision signs, using the four soft decisions $d'_{(0,0)}{}^2-d'_{(1,0)}{}^2$, $d'_{(0,1)}{}^2-d'_{(1,1)}{}^2$, $d'_{(0,0)}{}^2-d'_{(0,1)}{}^2$ and $d'_{(1,0)}{}^2-d'_{(1,1)}{}^2$ as a selection signal of the two 4:1 multiplexers.

In this case, the soft decisions corresponding to each of the bits $\tilde{b}_0$ and $\tilde{b}_1$, outputted from the first soft decision selection unit 336 of FIG. 3 according to the four predetermined soft decision signs, are illustrated in Table 1, and the soft decisions corresponding to the bits $\tilde{b}_{50}$ and $\tilde{b}_{51}$, outputted from the second soft decision selection unit 337 of FIG. 3 according to the four predetermined soft decision signs, are illustrated in Table 2.

TABLE 1

| $d_{(0,0)}^2 - d_{(0,1)}^2$ | $d_{(1,0)}^2 - d_{(1,1)}^2$ | $\tilde{b}_0$ | $d_{(0,0)}^2 - d_{(1,0)}^2$ | $d_{(0,1)}^2 - d_{(1,1)}^2$ | $\tilde{b}_1$ |
|---|---|---|---|---|---|
| − | − | $d_{(0,0)}^2 - d_{(1,0)}^2$ | − | − | $d_{(0,0)}^2 - d_{(0,1)}^2$ |
| − | + | $d_{(0,0)}^2 - d_{(1,1)}^2$ | − | + | $d_{(0,0)}^2 - d_{(1,1)}^2$ |
| + | − | $d_{(0,1)}^2 - d_{(1,0)}^2$ | + | − | $d_{(1,0)}^2 - d_{(0,1)}^2$ |
| + | + | $d_{(0,1)}^2 - d_{(1,1)}^2$ | + | + | $d_{(1,0)}^2 - d_{(1,1)}^2$ |

TABLE 2

| $d'_{(0,0)}{}^2 - d'_{(0,1)}{}^2$ | $d'_{(1,0)}{}^2 - d'_{(1,1)}{}^2$ | $\tilde{b}_{50}$ | $d'_{(0,0)}{}^2 - d'_{(1,0)}{}^2$ | $d'_{(0,1)}{}^2 - d'_{(1,1)}{}^2$ | $\tilde{b}_{51}$ |
|---|---|---|---|---|---|
| − | − | $d'_{(0,0)}{}^2 - d'_{(1,0)}{}^2$ | − | − | $d'_{(0,0)}{}^2 - d'_{(0,1)}{}^2$ |
| − | + | $d'_{(0,0)}{}^2 - d'_{(1,1)}{}^2$ | − | + | $d'_{(0,0)}{}^2 - d'_{(1,1)}{}^2$ |
| + | − | $d'_{(0,1)}{}^2 - d'_{(1,0)}{}^2$ | + | − | $d'_{(1,0)}{}^2 - d'_{(0,1)}{}^2$ |
| + | + | $d'_{(0,1)}{}^2 - d'_{(1,1)}{}^2$ | + | + | $d'_{(1,0)}{}^2 - d'_{(1,1)}{}^2$ |

As shown in Tables 1 and 2, the soft decision corresponds to each bit of the subcarriers and is selected according to the sign of the four predetermined soft decisions.

Figure 7:
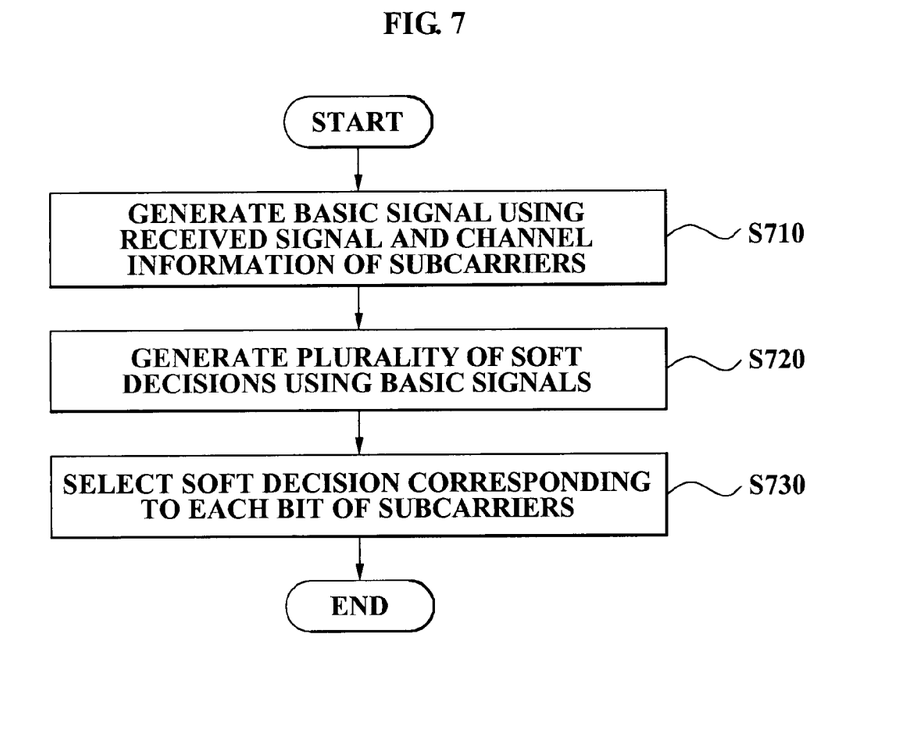
FIG. 7 is a flowchart illustrating an example of operation of a DCM demapping method according to an exemplary embodiment of the present invention.

FIG. 7 is a flowchart illustrating an example of operation of a DCM demapping method according to an exemplary embodiment of the present invention, and includes operations S710, S720, and S730, operation S710 generating basic signals using a received signal of subcarriers and channel information, operation S720 generating a plurality of soft decisions using the basic signals, and operation S730 selecting a soft decision corresponding to each bit of the subcarriers.

Referring to FIG. 7, in operation S710, the DCM demapping method according to the present invention generates the three basic signals using the signals and the channel information of the two subcarriers, acquired from a FFT calculation result of a signal received by a receiver.

In this case, the three basic signals, generated using the signal and the channel information, are represented by Equation 1. The generated basic signals may be a signal representing a power difference between two channels and signals representing a product of a conjugate of a channel gain and the signal for each of the two subcarriers.

In operation S720, a plurality of soft decisions is generated using the generated three basic signals. In this case, the plurality of soft decisions is generated using the signal with respect to power difference between the two channels and an in-phase component or a quadrature component of the remaining basic signals.

Figure 8:
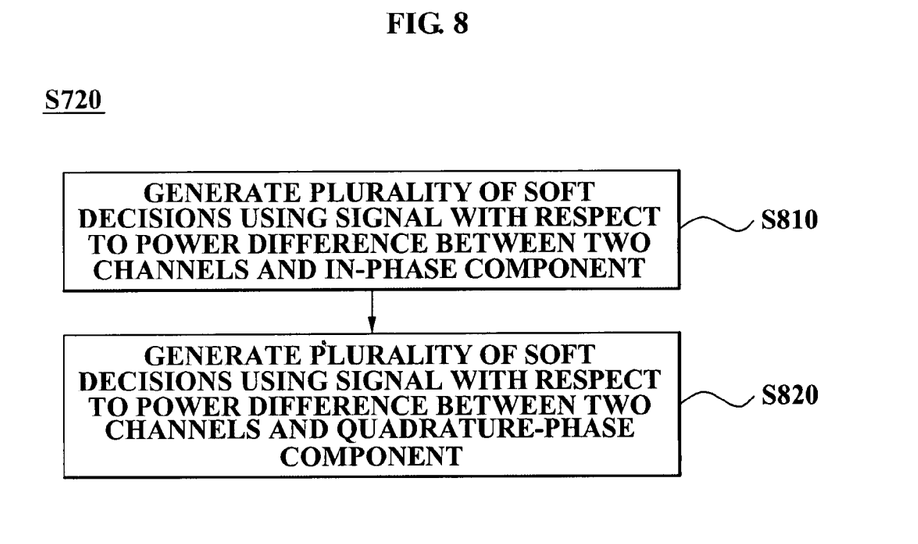
FIG. 8 is a flowchart illustrating operation S720 of FIG. 7.

FIG. 8 is a flowchart illustrating operation S720 of FIG. 7.

Referring to FIG. 8, operation S720 includes operation S810 and S820. In operation S810, the plurality of soft decisions are generated using the signal with respect to the power difference between the two channels and the in-phase component of the remaining basic signals, and in operation S820, the plurality of soft decisions are generated using the signal with respect to the power difference between the two channels and the quadrature-phase component of the remaining basic signals.

In this case, the seven soft decisions may be generated using the in-phase component and the quadrature-phase component. The seven soft decisions generated using the in-phase component are represented by Equation 2, and the seven soft decisions generated using the in-phase component are represented by Equation 3.

Figure 9:
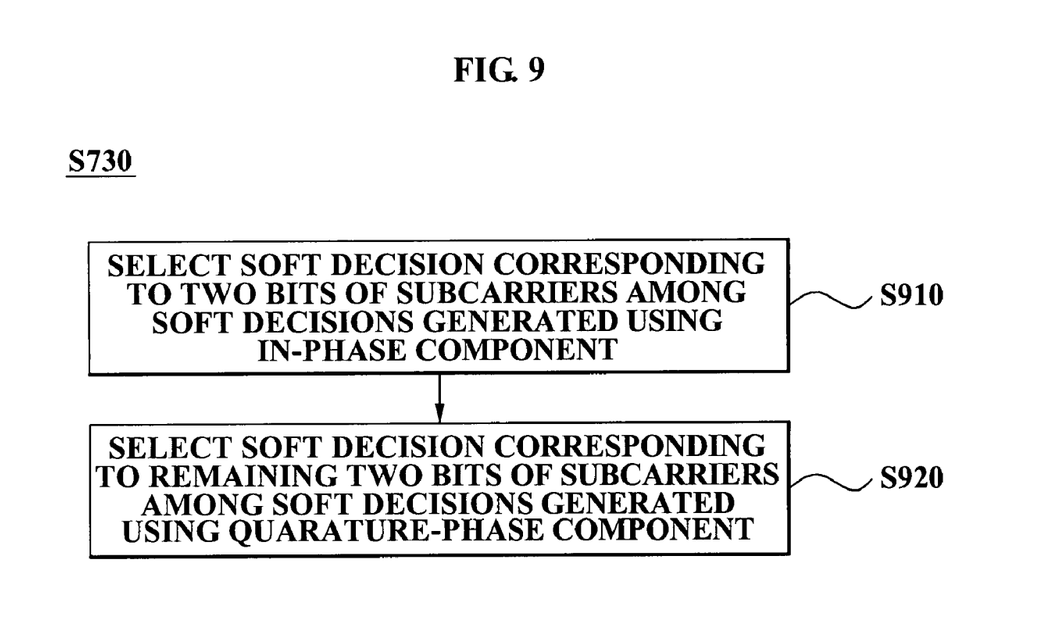
FIG. 9 is a flowchart illustrating operation S730 of FIG. 7.

Once the plurality of soft decisions are generated using the basic signals, the soft decision corresponding to each bit of the subcarriers is selected in operation S730, and FIG. 9 is a flowchart illustrating operation S730 of FIG. 7.

Referring to FIG. 9, operation S730 includes S910 and S920. In operation S910, a soft decision corresponding to each of two bits of the subcarriers is selected among the plurality of the soft decisions generated using the in-phase component. Also, in operation S920, a soft decision corresponding to remaining two bits of the subcarriers is selected among the plurality of the soft decisions generated using the quadrature-phase component.

In this case, the selecting of the soft decision corresponding to each of the two bits of the subcarriers may select the soft decision corresponding to each bit by multiplexing, which uses four predetermined soft decisions as a selection signal, among the respectively generated plurality of the soft decisions.

In this case, the soft decision corresponding to each of the two bits, selected by multiplexing the plurality of soft decisions which are generated using the in-phase component, may be identical to or different from each other.

Also, in this case, the soft decision corresponding to the two bits, selected by multiplexing the plurality of soft decisions which are generated using the quadrature-phase component, may be identical to or different from each other.

As an example, when 4 bits $\tilde{b}_0, \tilde{b}_1, \tilde{b}_{50}, \tilde{b}_{51}$ are received via a channel 0 and a channel 50, 2 bits $\tilde{b}_0, \tilde{b}_1$ may select soft decisions corresponding to $\tilde{b}_0, \tilde{b}_1$ by multiplexing the plurality of soft decisions generated using the in-phase component, and 2 bits $\tilde{b}_{50}, \tilde{b}_{51}$ may select soft decisions corresponding to $\tilde{b}_{50}, \tilde{b}_{51}$ by multiplexing the plurality of soft decisions generated using the quadrature-phase component. Also, the soft decisions selected as $\tilde{b}_0, \tilde{b}_1$ and the soft decisions selected as $\tilde{b}_{50}, \tilde{b}_1$ may be identical to or different from each other. Description regarding this will be omitted since the description has been described in Tables 1 and 2.

The DCM demapping method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

A DCM demapper and a DCM demapping method according to the present invention may be simple to embody and generate an accurate soft decision.

Also, a DCM demapper and a DCM demapping method according to the present invention may reduce a noise amplification effect by generating a soft decision close to a theoretical LLR, and improve reception performance.

Also, a DCM demapper and a DCM demapping method according to the present invention may extend a communication distance for DCM demodulation and modulation by improving reception performance.

Also, the DCM demapper and the DCM demapping method according to the present invention may reduce complexity of a configuration of hardware by approximating an exponential/a log function calculation of a theoretical LLR.

Also, the DCM demapper and the DCM demapping method according to the present invention may improve speed of generating a soft decision by reducing complexity of a configuration of hardware.

Also, the DCM demapper and the DCM demapping method according to the present invention may reduce manufacturing costs by reducing complexity of a configuration of hardware.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Dual Carrier Modulation (DCM) demapper for two subcarriers comprising a first subcarrier and a second subcarrier, the DCM demapper comprising:

a basic signal generation circuit which generates a plurality of basic signals using a received signal of the first subcarrier, channel information of the first subcarrier, a received signal of the second subcarrier, and channel information of the second subcarrier;

a soft decision generation unit which generates a plurality of soft decisions using the plurality of basic signals; and a soft decision selection unit which selects a soft decision corresponding to each bit of the two subcarriers, among the generated plurality of soft decisions, wherein the basic signal generation unit generates a signal of a power difference between two channels, a first signal of a product of a conjugate of a channel gain of the first subcarrier and the received signal of the first subcarrier signal, and a second signal of a product of a conjugate of a channel gain of the second subcarrier and the received signal of the second subcarrier, and wherein the plurality of soft decisions comprise a first plurality of soft decisions and a second plurality of soft decisions, the soft decision generation unit comprises:

a first soft decision generation unit which generates the first plurality of soft decisions using the signal of the power difference between the two channels and an in-phase component of the first signal and an in-phase component of the second signal; and a second soft decision generation unit which generates the second plurality of soft decisions using the signal of the power difference between the two channels and a quadrature-phase component of the first signal and a quadrature-phase component of the second signal.

2. The DCM demapper of claim 1, wherein the soft decision comprises a first soft decision and a second soft decision, and the soft decision selection unit comprises:
   a first soft decision selection unit which selects the first soft decision corresponding to two bits of the two subcarriers among the first plurality of soft decisions which are generated from the first soft decision generation unit; and
   a second soft decision selection unit which selects the second soft decision corresponding to remaining two bits of the two subcarriers among the second plurality of soft decisions which are generated from the second soft decision generation unit.

3. The DCM demapper of claim 2, wherein the first soft decision selection unit selects the first soft decision corresponding to the two bits of the two subcarriers, according to a sign of four predetermined soft decisions of the first plurality of soft decisions as a selection signal, and the second soft decision selection unit selects the second soft decision corresponding to the remaining two bits of the two subcarriers, according to a sign of four predetermined soft decisions of the second plurality of soft decisions as a selection signal.

4. The DCM demapper of claim 3, wherein the first and second soft decision selection units are multiplexers.

5. The DCM demapper of claim 1, wherein the soft decision selection unit selects the soft decision corresponding to the two bits according to a sign of four predetermined soft decisions as a selection signal.

6. A Dual Carrier Modulation (DCM) demapping method for two subcarriers comprising a first subcarrier and a second subcarrier, the method comprising:
   generating a plurality of basic signals using a signal of the first subcarrier, channel information of the first subcarrier, a signal of the second subcarrier, and channel information of the second subcarrier;
   generating a plurality of soft decisions using the plurality of basic signals; and
   selecting a soft decision corresponding to each bit of the two subcarriers, among the generated plurality of soft decisions,
   wherein the generating the plurality of basic signals generates a signal of a power difference between two channels, a first signal of a product of a conjugate of a channel gain of the first subcarrier and the signal of the first subcarrier, and a second signal of a product of a conjugate of a channel gain of the second subcarrier and the signal of the second subcarrier, and
   wherein the plurality of soft decisions comprise a first soft decision and a second soft decision and the generating the plurality of soft decisions comprises:
   generating the first plurality of soft decisions using the signal of the power difference between the two channels, an in-phase component of the first signal and an in-phase component of the second signal; and
   generating the second plurality of soft decisions using the signal of the power difference between the two channels, a quadrature-phase component of the first signal and a quadrature-phase component of the second signal.

7. The method of claim 6, wherein the selecting the soft decision corresponding to each bit of the two subcarriers comprises:
   selecting the first soft decision corresponding to two bits of the two subcarriers, among the first plurality of soft decisions; and
   selecting the second soft decision corresponding to remaining two bits of the two subcarriers, among the second plurality of soft decisions.

8. The method of claim 7, wherein the selecting the first soft decision comprises:
   selecting the first soft decision corresponding to the two bits of the two subcarriers according to a first predetermined selection signal, among the first plurality of soft decisions which are generated using real number components of the first and the second signals; and
   the selecting of the second soft decision comprises:
   selecting the second soft decision corresponding to the remaining two bits of the two subcarriers according a second predetermined selection signal, among the second plurality of soft decisions which are generated using an imaginary number components of the first and the second signals.

9. The method of claim 8, wherein the first soft decision corresponding to the two bits of the two subcarriers are selected by multiplexing using a sign of four predetermined soft decisions as a first selection signal, among seven soft decisions which are generated using real number components of the first and the second signals; and
   the second soft decision corresponding to the remaining two bits of the two subcarriers are selected by multiplexing using a sign of four predetermined soft decisions as a second selection signal, among seven soft decisions which are generated using the imaginary number components of the first and the second signals.

10. The method of claim 6, wherein the selecting of the soft decision corresponding to each bit of the two subcarriers comprises:
    selecting two soft decisions corresponding to the two bits by multiplexing, which uses sign of four predetermined soft decisions as a selection signal.

11. A non-transitory computer-readable medium storing a program for implementing a Dual Carrier Modulation (DCM) demapping method comprising;
    generating a plurality of basic signals using a signal of a first subcarrier and channel information of the first subcarrier, a signal of a second subcarrier, and channel information of the second subcarrier;
    generating a plurality of soft decisions, using the plurality of basic signals; and
    selecting a soft decision corresponding to each bit of the two subcarriers, among the generated plurality of soft decisions,
    wherein the generating the plurality of basic signals generates a signal of a power difference between two channels, a first signal of a product of a conjugate of a channel gain of the first subcarrier and the signal of the first subcarrier, and a second signal of a product of a conjugate of a channel gain of the second subcarrier and the signal of the second subcarrier, and
    wherein the plurality of soft decisions comprise a first soft decision and a second soft decision and the generating the plurality of soft decisions comprises:
    generating the first plurality of soft decisions using the signal of the power difference between the two channels, an in-phase component of the first signal and an in-phase component of the second signal; and
    generating the second plurality of soft decisions using the signal of the power difference between the two channels, a quadrature-phase component of the first signal and a quadrature-phase component of the second signal.

* * * * *